(12) United States Patent
Bitensky et al.

(10) Patent No.: US 12,185,746 B2
(45) Date of Patent: Jan. 7, 2025

(54) APPLE CIDER VINEGAR NUTRITIONAL SUPPLEMENT

(71) Applicant: GOLI NUTRITION INC., Westmount (CA)

(72) Inventors: Michael Bitensky, Westmount (CA); Nicol Korner-Bitensky, Dollard des Ormeaux (CA); Olivia Joan Dahm, Irvine, CA (US); Roger Arthur Tyre, Redondo Beach, CA (US); Sharon Hoffman, Gardena, CA (US); Deepak Agarwal, Westmount (CA)

(*) Notice: Subject to any disclaimer, the term of this patent is extended or adjusted under 35 U.S.C. 154(b) by 0 days.

(21) Appl. No.: 18/243,704

(22) Filed: Sep. 8, 2023

(65) Prior Publication Data

US 2023/0413884 A1    Dec. 28, 2023

Related U.S. Application Data

(63) Continuation of application No. 17/222,300, filed on Apr. 5, 2021, which is a continuation of application No. 17/012,607, filed on Sep. 4, 2020, now Pat. No. 10,980,266, which is a continuation of application
(Continued)

(51) Int. Cl.
*A23L 33/105* (2016.01)
*A23L 2/68* (2006.01)
*A23L 29/00* (2016.01)
*A23L 29/231* (2016.01)

(52) U.S. Cl.
CPC .............. *A23L 33/105* (2016.08); *A23L 2/68* (2013.01); *A23L 29/035* (2016.08); *A23L 29/231* (2016.08)

(58) Field of Classification Search
CPC .... A23L 33/105; A23L 29/035; A23L 29/231; A23L 2/68
See application file for complete search history.

(56) References Cited

U.S. PATENT DOCUMENTS

| | | | | |
|---|---|---|---|---|
| 3,296,079 A | * | 1/1967 | Griffin | A23L 27/30 424/49 |
| 5,955,321 A | * | 9/1999 | Bijl | C12P 19/42 536/26.41 |
| 5,993,853 A | | 11/1999 | Manning et al. | |

(Continued)

FOREIGN PATENT DOCUMENTS

| AT | 509000 | * | 5/2011 |
|---|---|---|---|
| CA | 2699579 A1 | | 10/2011 |

(Continued)

OTHER PUBLICATIONS

Buckholts. Copycat Zesty Aple Cide Vinaigrette. 2017. https://www.allrecipes.com/recipe/283062/copycat-zesty-apple-cider-vinaigrette/.*

(Continued)

*Primary Examiner* — Anthony J Weier
(74) *Attorney, Agent, or Firm* — Johnson | Dalal; Mark C. Johnson

(57) ABSTRACT

Shown herein is a nutritional supplement containing apple cider vinegar (ACV), including compositions, formulations, and combinations of ingredients in the ACV nutritional supplement, as well as processes for manufacturing these supplements. The nutritional supplement can include ACV, a gelling agent such as pectin or gelatin, an oligosaccharide, a disaccharide, and water.

20 Claims, 2 Drawing Sheets

Related U.S. Application Data

No. 16/682,710, filed on Nov. 13, 2019, now Pat. No. 10,791,755.

(60) Provisional application No. 62/842,945, filed on May 3, 2019, provisional application No. 62/832,870, filed on Apr. 11, 2019, provisional application No. 62/832,869, filed on Apr. 11, 2019.

(56) References Cited

U.S. PATENT DOCUMENTS

| | | | |
|---|---|---|---|
| 6,013,294 | A | 1/2000 | Bunke et al. |
| 6,461,657 | B1 * | 10/2002 | Philipsen ............... A23L 29/231 |
| | | | 426/324 |
| 6,838,107 | B1 * | 1/2005 | Bakal .................... A23D 7/0056 |
| | | | 426/549 |
| 7,037,519 | B1 | 5/2006 | Humphrey |
| 7,704,542 | B2 | 4/2010 | Bydlon et al. |
| 7,977,319 | B1 | 7/2011 | Levine |
| 8,815,797 | B2 | 8/2014 | Minor et al. |
| 9,126,203 | B2 | 12/2015 | Gennaro |
| 10,022,398 | B2 | 7/2018 | Ortega |
| 10,791,755 | B1 * | 10/2020 | Bitensky .................... A23L 2/68 |
| 10,980,265 | B2 | 4/2021 | Bitensky et al. |
| 10,980,266 | B2 | 4/2021 | Bitensky et al. |
| 11,252,985 | B1 | 2/2022 | Yiannios |
| 2010/0092622 | A1 | 4/2010 | Warner |
| 2011/0008502 | A1 | 1/2011 | Hosomi et al. |
| 2016/0219901 | A1 | 8/2016 | Rowe |
| 2016/0242450 | A1 | 8/2016 | Magana |
| 2017/0173091 | A1 * | 6/2017 | Lynch .................. A61K 38/063 |
| 2018/0295855 | A1 | 10/2018 | Rowe |
| 2020/0000135 | A1 | 1/2020 | Munsell |
| 2021/0219588 | A1 * | 7/2021 | Bitensky .................... A23L 2/68 |
| 2023/0330011 | A1 * | 10/2023 | Liang ...................... A23G 3/368 |

FOREIGN PATENT DOCUMENTS

| | | |
|---|---|---|
| CA | 2864531 A1 | 8/2015 |
| CN | 106072264 A | 11/2016 |
| CN | 106107803 A | 11/2016 |
| CN | 106165868 A | 11/2016 |
| CN | 107072239 A | 8/2017 |
| CN | 109156676 A | 1/2019 |

OTHER PUBLICATIONS

Frugal Hausfrau. 2015. https://frugalhausfrau.com/2015/10/23/sweet-sorghum-vinaigrette/.*
Translation for AT509000 published May 15, 2011. (available in U.S. Appl. No. 17/222,300).*
Sure-Jell Premium Pectin. 2024. https://www.amazon.com/Sure-Jell-Premium-Fruit-Pectin-Ounce/dp/B001E50XBQ/ref=sr_1_3?keywords=sure+jell+natural+premium+fruit+pectin&qid=1704921620&sr=8-3 (available in U.S. Appl. No. 17/222,300).*
Jovanovic-Malinovska. 2014. International Journal of Food properties 17:949-965. (available in U.S. Appl. No. 17/222,300).*
Food Data Central: Watermelon, raw. 2019. https://fdc.nal.usda.gov/fdc-app.html#/food-details/167765/nutrients (available in U.S. Appl. No. 17/222,300).*
Watermelon & Mint Jelly eCurry. 2009. http://www.ecurry.com/blog/condiments-dips-and-sauces/watermelon-mint-jelly/ (available in U.S. Appl. No. 17/222,300).*
Jalapeno Jelly. 2018. https://nomageddon.com/jalapeno-jelly-roasted-peppers/ (available in U.S. Appl. No. 17/222,300).*
Butter 101. Mar. 29, 2019. https://www.healthline.com/nutrition/foods/butter.*
Rohrig. Eating with Your Eyes. 2015. ChemMatters. pp. 5-7.*
Sparkling Charm. Oct. 2018. https://www.sparklingcharm.com/apple-cider-vinegar-honey-gummies/.*
Homemade Gummies. 2016. https://web.archive.org/web/20160313223704/https://www.to-made.com/homemade-gummy-bears.html.*
FoodData Central: Apple Juice. Apr. 1, 2019. https://fdc.nal.usda.gov/fdc-app.html#/food-details/173935/nutrients.*
Healthier Ginger Gummy Bears. Sep. 2018. https://www.heavenlynnhealthy.com/healthier-ginger-gummy-bears-vegan-cold-season/.*
Homemade Sour Gummy Snacks. 2012. https://mommypotamus.com/homemade-gummy-snacks/.*
Inch Calculator—Butter. 2024. https://www.inchcalculator.com/convert/tablespoon-to-gram/.*
Paxton, "Watermelon Jelly Recipe", Creative Homemaking, https://creativehomemaking.com/recipes/canning/watermelon-jelly, Jul. 6, 2014 (Jul. 6, 2014), retrieved from the internet on Aug. 8, 2023.
Bernardin, "Pear and Mint Jelly—Original Pectin", Bernardin Recipes: Jams and Jellies, https://www.bernardin.ca/recipes/en/pear-and-mint-jelly-original-pectin.htm?Lang=EN-US, Aug. 26, 2017 (Aug. 26, 2017), retrieved from the internet Aug. 8, 2023.
Shah, "Blueberry Chipotle Ketchup". Saveur, https://web.archive.org/20131103073940/https://www.saveur.com/article/ Aug. 28, 2013 (Aug. 28, 2013), retrieved from the internet on Aug. 8, 2023.
Examiner's Report issued in CA Application No. 3,078,001, 4 pages, dated Aug. 4, 2023.
"Passion Fruit Health & Beauty Cordial", Morinaga Passienol, MINTEL GNPD, Record ID 4830941, Publication Date May 2017. Retrieved on Jan. 5, 2023 via URL <https://www.gnpd.com/sinatra/recordpage/4830941/from_search/ZHOiSBmrUt/?page=1.
"Muesli Sliced Bread", Cannelle Bakery, MINTEL GNPD, Record ID 3710569, Publication Date Jan. 2016. Retrieved Jan. 5, 2023 via URL <https://www.gnpd.com/sinatra/recordpage/3710569/from_search/ZOYVHVj5KY/?page=1 =.
"Apple Cider Vinegar Plus Capsules", Abofit, MINTEL GNPD, Record ID 3138379, Publication Date May 2015. Retrieved on Jan. 5, 2023 via URL <https://www.gnpd.com/sinatra/recordpage/3138379/from_search/161edMuaeM/?page=1.
Examination Report Issued in Appl. No. 2021273637, 5 pages dated Jan. 9, 2023.
Sugar Drop Gum Drops. 2015. https://wonderfullymadeanddearlyloved.com/sugar-free-gum-drops/.
Bakerpedia. 2022. https://bakerpedia.com/ingredients/vinegar/.
Axe. 2018. The 5 Biggest Health Benefits of Apple Cider Vinegar. https://whatsgood.vitaminshoppe.com/ apple-cider-vinegar-health-benefits/.
Extended European Search Report in EP application No. 19886040. 5, 8 pages, dated Sep. 8, 2021.
International Preliminary Report on Patentabiltiy in PCT application No. PCT/US2019/061232, 13 pages, dated 28, 2021.
PredominatelyPaleo, "Homemade valentine's day gummies", https://predominantlypaleo.com/homemade-valentines-day-gummies/, Published Feb. 13, 2015.
The Peachee Pear, "Lemon-honey apple cider vinegar gummies", https://thepeacheepear.com/2019/02/15/apple-cider-vinegar-gummies/, Published Feb. 15, 2019.
Van Tiggelen, "Apple cider vinegar gummies and a simple AI P Halloween spread", https://asquirrelinthekitchen.com/apple-cider-vinegar-gummies-and-a-simple-aip-halloween-spread/, Published Nov. 2019.
Hilbilby Cultured Food, These Raspberry Switchel gummies are refined Sugar Free & the kids [little & big] love https://www.facebook.com/HilbilbyCulturedFood/posts/3013704795312205, Oct. 18, 2019.
Raspberry Jalapeno Freezer Jam. May 25, 2013. https://www.shoppersfood.com/recipes/view-recipe.16347.EE.html.
PCT International Application No. PCT/US19/61232, International Search Report of the International Searching Authority, dated Feb. 10, 2020, 9 pages.
PCT International Application No. PCT/US19/61232, Written Opinion of the International Searching Authority, dated Feb. 10, 2020, 6 pages.
Enzymedica Marketing, "What is the "Mother" in Apple Cider Vinegar?", Ingredient Science, https://enzymedica.com/blogs/ingredient-science/what-is-the-mother-in-apple-cider-vinegar, May 4, 2018, 5 pages.

(56) References Cited

OTHER PUBLICATIONS

Ethanol Uses, Benefits, and Chemical Safety Facts, https://www.chemicalfacts.org/ethanol, Jan. 14, 2020, 3 pages.

Sugarcane—Wikipedia, https://en.wikipedia.org/wiki/Sugarcane, Jan. 14, 2020, 17 pages.

Mr. Gummy Supplemental Facts, 1 page.

Mr Gummy, "Mr Gummy Apple Cider Vinegar Gummies (180-Count) Promote Fast Fat Burning Weight Loss, Gentle Colon Detox and Cleanse I Appetite Suppressant for Women, Men", https://www.amazon.com/Gummy-Vinegar-180-Count-Appetite-Suppressant/dp/B07N48NLFN, Webpage Accessed Dec. 18, 2019.

Ajibola et al, "Nutraceutical values of natural honey and its contribution to human health and wealth", Nutrition & vol. 9, No. 61, pp. 1-12, (2012).

Apple Cider Vinegar Gummies, https://www.ourordinarylife.com/2020/03/apple-cider-vinegar-gummies, Feb. 2018.

"Apple Cider Vinegar Honey Gummies", Sparkling Charm, https://www.sparklingcharm.com/apple-cider-vinegar-gummies, Oct. 2018.

Eisele et al, "The partial compositional characteristics of apple juice from 175 apple varieties", Journal of Food Composition and Analysis, vol. 18, pp. 213-221, (2005).

Examination Report in corresponding AU application No. 2019356037, dated Feb. 11, 2021, 7 pages.

Apple Cider Vinegar Gummies, Jan. 2019, https://homeisformaking.com/recipe/apple-cider-vinegar-gummies/.

\* cited by examiner

APPLE CIDER VINEGAR NUTRITIONAL SUPPLEMENT

PRIORITY

This application is a continuation of U.S. patent application Ser. No. 17/222,300, filed Apr. 5, 2021, which is a continuation of U.S. patent application Ser. No. 17/012,607, filed Sep. 4, 2020, now U.S. Pat. No. 10,980,266, issued Apr. 20, 2021, which is a continuation of U.S. patent application Ser. No. 16/682,710, filed Nov. 13, 2019, now U.S. Pat. No. 10,791,755, issued Oct. 6, 2020, which claims priority to and the benefit under 35 U.S.C § 119 (e) of U.S. Provisional Patent Application Ser. No. 62/832,869, filed Apr. 11, 2019, U.S. Provisional Patent Application Ser. No. 62/832,870, filed Apr. 11, 2019, and U.S. Provisional Patent Application Ser. No. 62/842,945, filed May 3, 2019. The foregoing applications are incorporated herein by reference in their entireties.

FIELD

This application relates generally to an apple cider vinegar nutritional supplement, including compositions, formulations, and combinations of ingredients in the apple cider vinegar nutritional supplement, as well as processes for manufacturing embodiments of such supplements.

BACKGROUND

Ranked as one of the healthiest foods to include in a diet, apples are rich in antioxidants, fiber, and vitamin C. When apples are fermented into apple cider vinegar ("ACV"), apples produce acetic acid. There are many known benefits of the acetic acid in ACV, including but not limited to, aiding in digestion, breaking down food, boosting the immune system, improving skin complexion, and detoxification. ACV has also been known to assist in weight loss.

However, the relatively high acidity of ACV makes it difficult to consume in liquid form due to an unpleasant taste, smell, and flavor. Moreover, the relatively high acidity in ACV has been known to cause damage to tooth enamel, and also to irritate the esophagus. Other consumables and nutritional supplements that incorporate ACV have failed to solve the problems associated with ACV intake, including eliminating the unpleasant tastes, smell, and flavor of ACV.

Therefore, what is needed is an improved nutritional supplement that includes a specifically-developed composition of ingredients, including ACV, that reduces significantly or eliminates the unpleasant ACV taste, smell and flavor.

SUMMARY

Disclosed herein is a food product, which can include apple cider vinegar at about 6% to 35% by weight, pectin, an oligosaccharide, a disaccharide at about 25% to 70% by weight, and water. In some embodiments, the disaccharide is by weight between about 30% and 60% or about 35% and 50%. In some embodiments, the apple cider vinegar is by weight is between about 7% and 30%, about 8% and 25%, or about 12% and 13%. In some embodiments, the pectin is by weight between about 1% and 20%, or about 1.75% and 7%. In some embodiments, the oligosaccharide is by weight between trace amounts and about 65%, about 25% and 55%, or about 30% and 50%. In some embodiments, the food product can include apple cider mother of vinegar.

In some embodiments, the food product can include an acidifying agent and a buffer agent. The acidifying agent can be by weight between trace amounts and about 10%, or about 0.3% to 2.5%. The buffer agent can be by weight between trace amounts and about 3%, or about 0.2% and 1.5%. In some embodiments, the acidifying agent can be selected from the group consisting of lactic acid, formic acid, citric acid, malic acid, tartaric acid, and a combination thereof. The buffer agent can be selected from the group consisting of sodium citrate, magnesium citrate, potassium citrate, zinc citrate, protein, amino acid, and a combination thereof. In some embodiments, the food product can include a natural flavor, the natural flavor can be a volatile substance such as ethanol.

In some embodiments, in the food product disclosed herein by weight percentages, the apple cider vinegar can be between about 6% and 20%, the pectin can be between about 1.75% and 7%, the oligosaccharide can be between about 30% and 47.5%, the disaccharide can be between about 35% and 50%, and the water can be between about 5% and 16%. In some embodiments, in the food product disclosed herein by weight percentages, the apple cider vinegar can be about 12.5%, the pectin can be between about 8% and 20%, the oligosaccharide can be between about 10% and 40%, the disaccharide can be between about 35% and 65%, and the water can be between about 2% and 5%.

In some embodiments of the food product disclosed herein, the oligosaccharide can be tapioca and the disaccharide can be cane sugar. The food product can include by weight sodium citrate between about 0.01% and 0.03%; citric acid between about 6% to 10%; malic acid between about 3% and 8%; a natural flavor between about 0.1% and carrot between about 0.01% and 0.2%; apple between about 0.01% and 0.2%; blackcurrant between about 0.08% and 0.17%; beet root of about 0.001%; pomegranate of about 0.001%; vitamin B9 of about 0.005%; and vitamin B12 of about 0.00003%.

In some embodiments, the food product can include apple cider vinegar, gelatin, an oligosaccharide, a disaccharide at about 25% to 70% by weight, and water. In some embodiments, the apple cider vinegar can be between about 5% to 20%, the gelatin can be between about 3% to 20%, and the water can be between about 5% to 20%.

Further disclosed herein is a method of producing the food product, which can include hydrating pectin with water under heat, solubilizing a disaccharide and an oligosaccharide, forming a mixture of the hydrated pectin and the solubilized disaccharide and oligosaccharide, adding a buffer agent to the mixture, adding apple cider vinegar to the mixture, adding a natural flavor to the mixture, adding an acidifying agent to the mixture, cooking the mixture between about 85 to 115 Celsius for about 5 to 60 minutes, holding the mixture between about 90 to 100 Celsius for about 5 to 30 minutes, and depositing the mixture into a mold.

BRIEF DESCRIPTION OF DRAWINGS

In order to facilitate a full understanding of the present disclosure, reference is now made to the accompanying drawings, in which like elements are referenced with like numerals. These drawings should not be construed as limiting the present disclosure, but are intended to be illustrative only. The drawings are not necessarily to scale, or inclusive of all elements of a system, emphasis instead generally being placed upon illustrating the concepts, structures, and techniques sought to be protected herein.

DESCRIPTION

Figure 1:
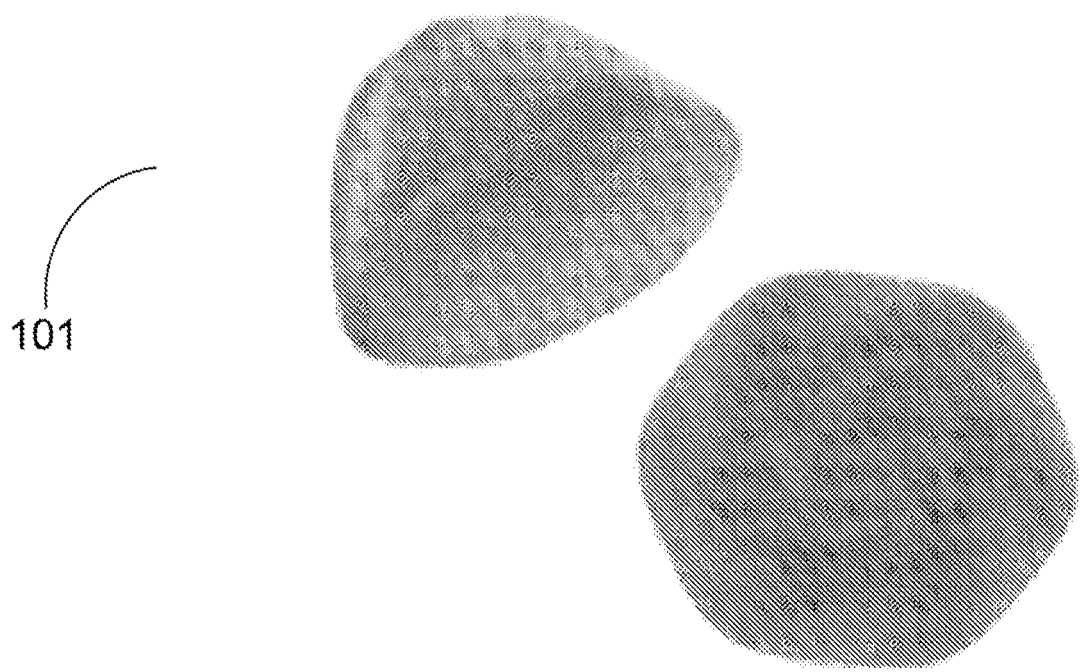
FIG. 1 depicts an ACV gummy design of the nutrition supplement, according to some embodiments of the present disclosure.

The nutritional supplement described herein delivers all the age-old traditional benefits of ACV packed into a pleasant and delicious tasting gummy, gelatin, or other product, that may also be infused with super foods and vitamins. Embodiments of the present disclosure described herein effectively mask the flavor of ACV, making the gummy (or other forms, as mentioned later on) much more appealing to consumers.

The current disclosure also describes embodiments that mask the unpleasant taste of ACV without the use of excessive levels of sugar. For example, the use of an amount of sugar that exceeds the solubility point can cause undesirable crystallization and hardening of the supplement. Moreover, excessive sugar can be undesirable for consumers with a goal of minimizing their daily sugar intake for health purposes.

Any discussion of numerical values or ranges such as weight percentages and pH values can be understood as referring to the exact values and also reasonable approximations of those values/ranges as would be understood to a person of ordinary skill in the art.

In some embodiments, the nutritional supplement disclosed herein may include ACV. Some non-limiting concentrations of ACV in the nutritional supplement in weight percentages can include, but not limited to, about 0.1% to 50%, about 1% to 45%, about 5% to 40%, about 6% to 35%, about 7% to 30%, about 8% to 25%, about 9% to 20%, about 10% to 15%, about 0.1% to 30%, about 2.5% to 25%, or about 5% to 20%. In some embodiments, the concentration of the ACV can be about 2.5% to 25% by weight. In some embodiments, the concentration of the ACV can be about 5% to 20% by weight. In some embodiments, the concentration of the ACV can be about 12% to 13% by weight. In some embodiments, the concentration of the ACV can be about 12.5% by weight.

In some embodiments, the nutritional supplement disclosed herein may include an oligosaccharide. In some embodiments, the oligosaccharide can be a syrup. Exemplary syrups can include, but are not limited to, glucose syrup, corn syrup, rice syrup, invert syrup, isomaltooligosaccharide (IMO) sugar, tapioca, fructooligosaccharide (FOS) syrup, starch, fiber syrup, inulin, fruit puree, fruit concentrate, high maltose syrup, agave syrup, and any combinations thereof. In some embodiments, the syrup can be a corn syrup including a dextrose equivalent (DE) of about 40 to about 70 DE. In some embodiments embodiment, the corn syrup comprises a DE of about 55 to 62 DE. In some embodiments, the corn syrup is about 62 DE. The corn syrup can be a high fructose corn syrup. In some embodiments, tapioca can be used. Some non-limiting concentrations of syrup in the nutritional supplement in weight percentages can include, but not limited to, about 0.1% to 80%, about 5% to 75%, about 10% to 70%, about 15% to 65%, about 20% to 60%, about 25% to 55%, about 30% to 50%, about 35% to 47.5%, about 1% to 65%, about 25% to 55%, or about 30% to 47.5%. In some embodiments, the concentration of the syrup can be about 1% to 65% by weight. In some embodiments, the concentration of the syrup can be about 25% to 55% by weight. In some embodiments, the concentration of the syrup can be about 30 to 47.5% by weight.

In some embodiments, the nutritional supplement disclosed herein may include a gelling agent. Exemplary gelling agents can include, but not limited to pectin, gelatin, seaweed extract, agar, carrageenan, gum Arabic, and any combinations thereof. In some embodiments, pectin can be used as a gelling agent. In some embodiments, gelatin can be used as a gelling agent. Some non-limiting concentrations of gelling agent in the nutritional supplement in weight percentages can include, but not limited to, about 0.1% to 60%, about 0.5% to 50%, about 1% to 40%, about 1.5% to 35%, about 1.75% to 30%, about 2% to 20%, or about 5% to 7%. In some embodiments, the concentration of the gelling agent can be about 1% to 20% by weight. In some embodiments, the concentration of the gelling agent can be about 1.5% to 10% by weight. In some embodiments, the concentration of the gelling agent can be about 1.75% to 7% by weight. In some embodiments, the concentration of the gelling agent can be about 8% to 20% by weight. In some embodiments, the concentration of the gelling agent can be about 1% to 50% by weight. In some embodiments, the concentration of the gelling agent can be about 2% to 30% by weight. In some embodiments, the concentration of the gelling agent can be about 3% to 20% by weight.

In some embodiments, gelatin may be used as a gelling agent. Examples of gelatins can include but are not limited to 120 Bloom gelatin, 125 Bloom gelatin, 160 Bloom gelatin, 190 Bloom gelatin, 200 Bloom gelatin, 220 Bloom gelatin, 250 Bloom gelatin, and any combinations thereof. The gelatin can be acid treated. In some embodiments, the gelatin has a bloom strength from about 80 to 250 Bloom. In some embodiments, the gelatin has a bloom strength from about 125 to 250 Bloom. In some embodiments, the gelatin has a bloom strength of about 160 to 250 Bloom. In some embodiments, the gelatin has a bloom strength of about 190 to 250 Bloom.

In some embodiments, the nutritional supplement disclosed herein can include a sweetener. In some embodiments, the sweetener can be a disaccharide. Exemplary sweeteners can include, but not limited to, non-organic cane sugar, organic cane sugar, sugar alcohol, natural sweeteners such as *stevia* or monk fruit, sugar alternatives such as short length carbohydrate, any of the plethora of artificial sweeteners known to one of ordinary skill in the art, and any combinations thereof. In some embodiments, organic cane sugar can be used as a sweetener. Some non-limiting concentrations of sweetener in the nutritional supplement in weight percentages can include, but not limited to, about 10% to 80%, about 15% to 75%, about 20% to 70%, about 25% to 65%, about 30% to 60%, about 35% to 55%, or about 40% to 50%. In some embodiments, the concentration of the sweetener can be about 25% to 70% by weight. In some embodiments, the concentration of the sweetener can be about 35% to 60% by weight. In some embodiments, the concentration of the sweetener can be about 42% to 50% by weight.

In some embodiments, the weight ratio between disaccharide and oligosaccharide in the disclosed nutritional supplement can be about 0.2/1 to 10/1, about to 9/1, about 0.6/1 to 8/1, about 1/1 to 6/1, or about 5/1.

In some embodiments, the nutritional supplement disclosed herein can include water. Some non-limiting concentrations of water in the nutritional supplement in weight percentages can include, but not limited to, about 0.1% to 40%, about 0.5% to 30%, about 1% to 25%, about 2% to 20%, about 5% to 16%, about 7% to 13%, or about 10% to 12%. In some embodiments, the concentration of the water can be about 1% to 25% nutritional supplement. In some embodiments, the concentration of the water can be about 2% to 20% nutritional supplement. In some embodiments, the concentration of the water can be about 5% to 16% nutritional supplement. In some embodiments, the concentration of the water can be about 2% to 5% nutritional supplement. In some embodiments, the concentration of the water can be about 5% to 20% nutritional supplement.

In some embodiments, the ACV also contains "the mother," which can include strands of proteins, the enzymes and friendly bacteria that give the product a murky appearance. In some embodiments, the ACV contains a component known in the field as "the mother," a substance containing cellulose and acetic acid bacteria. The bacteria found in "the mother" can belong to the *Acetobacter* and *Gluconobacter* genera. These Gram-negative, aerobic bacteria can enable the acetification process, where alcohol, in the presence of oxygen, is converted to acetic acid, the principle component in vinegar. The bacteria in "the mother" may contribute to the ACV health benefits.

In some embodiments, the nutritional supplement disclosed herein may include an acidifying agent. Exemplary acidifying agents can include, but not limited to lactic acid, formeric acid, citric acid, malic acid, fumaric acid, tartaric acid, glucono-delta lactone, salts of gluconic acid, phosphoric acid, succinic acid, adipic acid, ascorbic acid, acetic acid, and any combinations thereof. In some embodiments, citric acid can be used as an acidifying agent. Some non-limiting concentrations of the acidifying agents in the nutritional supplement in weight percentages can include, but not limited to, from a trace amount to about 15%, about 0.1% to 10%, about 0.2% to 7%, about 0.3% to 5%, about to 4%, about 0.7% to 3%, or about 1% to 2.5%. In some embodiments, the concentration of the acidifying agent can be from a trace amount to about 10% by weight. In some embodiments, the concentration of the acidifying agent can be about 0.2% to 5% by weight. In some embodiments, the concentration of the acidifying agent can be about to 2.5% by weight.

In some embodiments, the nutritional supplement disclosed herein may include a buffer agent. Exemplary acidifying agents can include, but not limited to sodium citrate, magnesium citrate, trisodium citrate, bisodium citrate, any protein or amino acids, and any combinations thereof. In some embodiments, sodium citrate can be used as a buffer agent. Some non-limiting concentrations of the buffer agent in the nutritional supplement in weight percentages can include, but not limited to, from trace amount to about 5%, about 0.1% to 4%, about 0.2% to 3%, about 0.3% to 2%, about 0.4% to 1%, or about 0.5% to 0.7%. In some embodiments, the concentration of the buffer agent can be from trace amount to about 10% by weight. In some embodiments, the concentration of the buffer agent can be about 0.1% to 2% by weight. In some embodiments, the concentration of the buffer agent can be about 0.2% to 1.5% by weight.

In some embodiments, the nutritional supplement disclosed herein may include a flavorant. Exemplary flavorants can include oils including but not limited to spearmint oil, peppermint oil, cinnamon oil, oil of wintergreen (methylsalicylate), clove oil, bay oil, anise oil, eucalyptus oil, thyme oil, cedar leaf oil, oil of nutmeg, oil of sage, oil of bitter almonds, cassia oil, and any combinations thereof. The flavorants can include artificial, natural or synthetic fruit flavors such as citrus or fruit oils and/or essences including apple, apricot, banana, blueberry, cherry, grape, grapefruit, kiwi, lemon, lime, orange, pear, peach, pineapple, plum, raspberry, strawberry, tangerine and watermelon. Mixtures of the aforementioned flavors are possible. In some embodiments, the concentrations of the flavorants in weight percentages can be from trace amount to about 0.6%, about 0.1% to about 0.2% to 0.4%, or about 0.15% to 0.35%.

Additional flavorants may include, but are not limited to menthol, artificial vanilla, cinnamon derivatives, and various fruit flavors, whether employed individually or in admixture. Flavorings can also include, for example, aldehydes and esters including cinnamyl acetate, cinnamaldehyde, citral diethylacetal, dihydrocarvyl acetate, eugenyl formate, p-methylamisol, acetaldehyde (apple); benzaldehyde (cherry, almond), anisic aldehyde (licorice, anise); cinnamic aldehyde (cinnamon); citral, i.e., alpha citral (lemon, lime); ethyl vanillin (vanilla, cream); hellotropine, i.e., piperonal (vanilla, cream); vanillin (vanilla, cream); alpha-amyl cinnamaldehyde (spicy fruity flavors); butyraldehyde (butter, cheese); valcraldehyde (butter, cheese); citronellal; decannal (citrus fruits); CA 02864531 2014 Sep. 19 aldehyde C-8 (citrus fruits); aldehyde C-9 (citrus fruits); aldehyde C-12 (citrus fruits); 2-ethylbutyraldehyde (berry fruits); tolyl aldehyde (cherry, almond); veratraldehyde (vanilla); 2,6-dimethyl-5-heptenal, i.e., melonal (melon); 2,6-dimethyloctanal (green fruit); and 2-dodecenal (citrus, mandarin), mixtures thereof and the like. Additional flavor compounds include ethylacetate, thiophene, ethylpropionate, ethyl butyrate, 2-hexanoate, 2-methylpyrazine, heptaldehyde, 2-octanone, limonene, and eugenol.

In some embodiments, a natural flavor is used for the disclosed nutritional supplement food product. The natural flavor may include a volatile substance which can be easily evaporated at ambient pressure and temperature. In some embodiments, the volatile substance in the natural flavor may be an alcohol such as ethanol.

In some embodiments, the nutritional supplement disclosed herein may include a colorant. Exemplary colorants can include natural or uncertified colors from natural sources or certified colors for the effect of color. In some embodiments, the colorant can include dyes, certified aluminum lakes or colors derived from a natural source. The colorant may be water-based, oil-based or dry. The colorants can be primary colors, blends of colors or discrete mixtures of colors, such as confetti. The concentrations of the colorant in the nutritional supplement in weight percentages can be from trace amount to about 0.6%, about 0.1% to 0.5%, about 0.2% to 0.4%, or about 0.15% to 0.35%.

In some embodiments, the nutritional supplement disclosed herein may include vitamins. Examples of vitamins can include, but are not limited to vitamin E, vitamin C, vitamin B12, vitamin B3, and vitamin B6, vitamin B9, and any combinations thereof. In some embodiments, the nutritional supplement can include vitamin B9 from trace amount to about 0.10%, about 0.001% to 0.05%, about 0.002% to 0.01%, or about 0.003% to by weight. In some embodiments, the concentration of vitamin B9 is about by weight. For a serving of about 4 g gummy, the amount of B9 can be about a trace amount to 5,000 microgram (µg), about 1 µg to 3,0001 µg, about 51 µg to 1,500 µg, about 10 µg to 900 µg, about 50 µg to 800 µg, about 1 µg to 800 µg, or about 50 µg to 1,000 µg. In some embodiments, the nutritional supplement can include vitamin B12 from trace amount to about 0.10%, about 0.00001% to 0.05%, about 0.00002% to 0.01%, or about 0.00003% to 0.005% by weight. In some embodiments, the concentration of vitamin B12 is about 0.00003% by weight. For a serving of about 4 g gummy, the amount of B12 can be about trace amount to 100 μg, about 0.1 μg to 50 μg, about 0.12 μg to 38.4 μg, about 0.24 μg to 19.2 μg, about 0.6 μg to 9.61 μg, about 0.12 μg to 9.6 μg, or about 0.6 μg to 38.4 μg.

In some embodiments, the nutritional supplement can include amino acids, which can include, but are not limited to histidine, isoleucine, leucine, lysine, methionine, phenylalamine, threonine, tryptophan, valine, alanine, arginine, asparagine, aspartic acid, cysteine, glutamic acid, glutamine, glycine, ornithine, proline, selenocysteine, serine, tyrosine, and combinations thereof. In some embodiments, the nutritional supplement can include about 0.05% to 10% amino acids by weight.

In some embodiments, the nutritional supplement can optionally include an emulsifier. Some non-limiting examples of emulsifiers can include, but are not limited to sucrose esters, soy lecithin, sunflower lecithin, egg lecithin, lecithins and combinations thereof. In some embodiments, the nutritional supplement can include an emulsifier in weight percentages from trace amount to about 1%, about 0.2% to 0.8%, trace amount to about 0.5%, about 0.5% to 1%, about 0.3% to 0.6%, or about 0.1% to 0.5%.

In some embodiments, the nutritional supplement of the present disclosure can optionally be coated with a wax and/or oil. Some non-limiting examples of suitable wax can include, but are not limited to carnauba wax, bees wax, and the like. Sone non-limiting examples of suitable oils can include, but are not limited to mineral oil, coconut oil, vegetable oil, and the like. The nutritional supplement of the present disclosure can further be coated with a flavorant, such as sugar granules or flavor particles.

Various other ingredients in the disclosed nutritional supplement that may be used include, but are not limited to, herbal additives, ascorbic acid, cocoa powder to create chocolate, cocoa butter, palm kernel oil, sunflower lecithin, or soy lecithin. In some embodiments, the nutritional supplement may also include cannabidiol (CBD), ginger, tetrahydrocannabinol (THC), pepper, chili, cayenne, turmeric, collagen, buteric acid, salts or esters of beta-hydroxybutyric acid (BHB), or any combinations thereof. In some embodiments, the nutritional supplement can include organic carrot, organic apple, organic blackcurrant, organic beet root, organic pomegranate, or any combinations thereof.

FIG. 1 depicts an exemplary gummy design 101 as used in the ACV nutritional supplement, according to some embodiment of the present disclosure. The ACV nutritional supplement of this disclosure may take many other forms, including, but not limited to, chewables, worms, caramel steering, hard candy, or chocolate. In some embodiments, the ACV nutritional supplement can include by weight about 10% to 30% organic tapioca, about 2% to 5% water, about 45% to 65% organic cane sugar, about 12.5% ACV, about 8% to 20% pectin, about 0.01% to 0.03% sodium citrate, about 6% to 10% citric acid, about 3% to 8% malic acid, about 0.1 to 0.3% natural flavor, about to 0.2% organic carrot, about 0.01% to 0.2% organic apple, about 0.08% to 0.17% organic blackcurrant, about 0.001% organic beet root, about 0.001% organic pomegranate, about 0.005% vitamin B9, and about 0.00003% vitamin B12.

Figure 2:
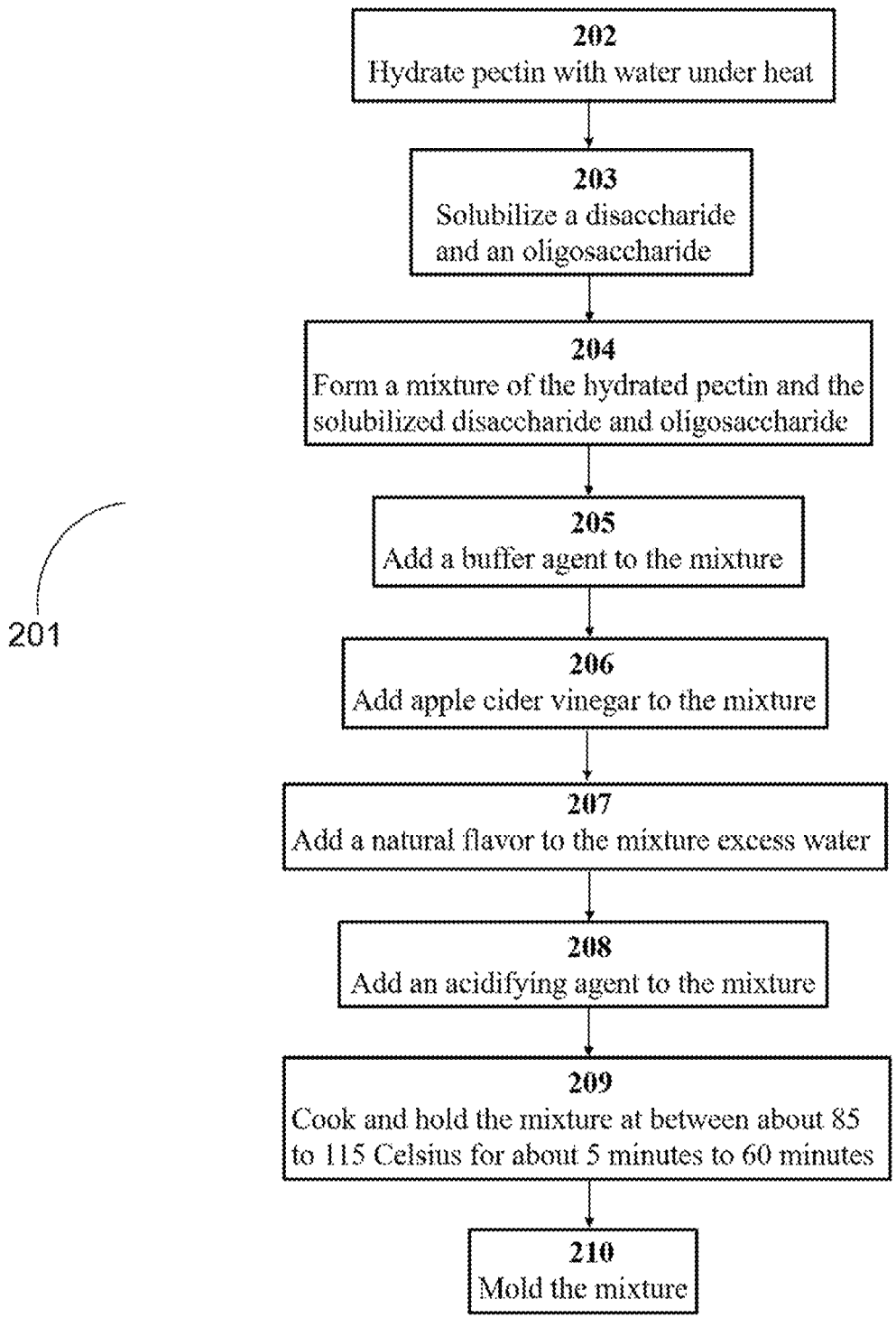
FIG. 2 shows a flowchart illustrating the manufacturing process of a nutrition supplement, according to some embodiments of the present disclosure.

FIG. 2 depicts an exemplary process 201 for manufacturing apple cider vinegar nutritional supplements with a strongly mitigated or masked apple cider vinegar flavor, according to some embodiments of the present disclosure. The process starts at step 202 to hydrate a gelling agent such as a pectin with water at an elevated temperature of about 90 to 100 Celsius and pH value of about 4.2 to 5.6. Then at step 203, a disaccharide and an oligosaccharide are solubilized. Step 204 forms a mixture of the hydrated pectin and the solubilized disaccharide and oligosaccharide. At step 205, a buffer agent is added to the mixture to maintain the mixture at a pH value of about 4.2 to 5.6. At step 206, apple cider vinegar is added. At step 207, a natural flavor is added into the mixture. At step 208, an acidifying agent is added to the mixture at an elevated temperature of about 80 to 110 Celsius and a pH value of about 2.8 to 3.7. At the next step 209, the mixture is cooked and held between about 85 to 115 Celsius for about 5 to 60 minutes. The temperature range for the cooking step 209 may vary with the specific gelling agent used, some of which is generally known to one of ordinary skill in the art. For example, if agar, gelatin, or starch is used, the temperature in some embodiments may be between 30 and 90 degrees Celsius. And for example, if the gelling agent is carrageenan, the temperature in some embodiments may be between 50 and 150 degrees Celsius. The mixture is then deposited into a starch tray or silicone mold at step 210. Once this has been done, the mixtures may undergo drying. Finally, the mixture may be packaged for distribution. Throughout the process, in some embodiments, various other properties must be kept within certain ranges.

The pH levels in some embodiments can have desired ranges, but these can vary with the gelling agent. If gelatin, pectin, or carrageenan are used, the pH in some embodiments can be kept between about 2 and 6. If agar is used, the pH in some embodiments can be kept between about 3 and 8. In some embodiments, if pectin is used, the pH in the finished product is about 2.5 to 4.

Furthermore, in some embodiments, various ranges for other properties can assist in the masking of the flavor, such as the water activity (the ratio of the partial pressure of water in the atmosphere in equilibrium with the substrate (e.g. a food) to that of the atmosphere in equilibrium with pure water at the same temperature), brix (the sugar content of an aqueous solution), and levels of acetic acid. In some embodiments, these ranges include a water activity between about 0.3 and 0.85, brix value between about 0.65 and 0.99, and acetic acid levels between about 1% and 50%.

In some embodiments, the nutritional supplement in the present disclosure can have a density of from about 0.6 g/cm$^3$ to 1.4 g/cm$^3$, about 0.7 g/cm$^3$ to 1.3 g/cm$^3$, about g/cm$^3$ to 1.2 g/cm$^3$, about 0.9 g/cm$^3$ to 1.1 g/cm$^3$, about 0.8 g/cm$^3$ to 1.0 g/cm$^3$, about 1.0 g/cm$^3$ to 1.2 g/cm$^3$, about 0.9 g/cm$^3$ to 1.2 g/cm$^3$, about 0.7 g/cm$^3$ to 1.1 g/cm$^3$, about g/cm$^3$ to 1.15 g/cm$^3$, about 0.95 g/cm$^3$ to 1.05 g/cm$^3$, or about 1.05 g/cm$^3$ to 1.25 g/cm$^3$.

The gel structure of the disclosed nutritional supplement product can be further characterized by textural analysis, such as firmness and resilience (also known as spring back). Firmness and resilience can be measured using a TA.TX texture analyzer (Texture Technologies; Hamilton, Mass.) using conventional methods. Firmness and resilience of the gel structure can be measured in grams force using a TA.TX texture analyzer in compression mode. In some embodiments, the nutritional supplement product can include a gel structure having a firmness measured in grams force of from about 450 g to 1550 g, about 500 g to 1400 g, about 700 g to 1300 g, about 800 g to 1200 g, about 900 g to 1100 g, about 700 g to 1000 g, about 850 g to 1350 g, about 600 g to 900 g, about 550 g to 750 g, or about 925 g to 1275 g.

In some embodiments, the nutritional supplement product can include a gel structure having a resilience of from about 20% to 60% spring back after being held under about 20% compression strain for about one minute. In some embodiments, the nutritional supplement product can include a gel structure having a resilience of from about 25% to 55% spring back, about 35% to 45% spring back, about 30% to 50% spring back, about 20% to 40% spring back, about 40% to 60% spring back, about 30% to 60% spring back, or about 25% to 45% spring back after being held under about 20% compression strain for about one minute. Over the shelf life of the nutritional supplement product, the spring back may be reduced by about 10% to 80%, by about 20% to 70%, by about 30% to 60%, or by about 40% to 50%.

In some embodiments, firmness and/or resilience can be measured at one or more time points during the shelf-life of the nutritional supplement product. In some embodiments, the firmness and/or resilience can be measured at about 0 days to 90 days after production of the nutritional supplement product; at about 1 day to 100 days after production of the nutritional supplement product; or at about 7 days to 80 days after production.

The nutritional supplement product of the present disclosure can be provided in multiple sizes and shapes as desired, including but not limited to, geometric shapes such as a cylinder, sphere, cube, pyramid, and the like; and novelty shapes such as novelty characters, bears, stars, worms, rings fruit, and the like. In some embodiments, the nutritional supplement product can be in the shape of a substantially rounded cylinder, such as a dot form or rounded, truncated cone, or cylinder form. The individual pieces in that embodiment can have a diameter of from about 14 mm to 18 mm, about 12 mm to 20 mm, about 13 mm to 15 mm, or about 15 mm to 18 mm. The individual pieces in that embodiment can have a height of from about 14 mm to 22 mm, about 15 mm to 20 mm, about 16 mm to 18 mm, or about 17 mm to 22 mm. In some embodiments, the weight of an individual piece can be from about 1 gram to 10 grams, about 1 gram to 8 grams, about 1 gram to 6 grams, about 1 gram to 4 grams, about 2 grams to 4 grams, about 2.2 grams to 2.8 grams, about 2.5 grams to 3.5 grams, or about 3 grams to 4 grams. In some embodiments, the weight of an individual piece can be about 4 grams.

Those skilled in the art will recognize, or be able to ascertain, using no more than routine experimentation, numerous equivalents to the specific composition and procedures described herein. Such equivalents are considered to be within the scope of this disclosure, and are covered by the following claims.

The invention claimed is:

1. A food product, comprising:
   apple cider vinegar and about 0.1% to 50% by weight;
   a disaccharide at about 10% to 70% by weight;
   an oligosaccharide;
   a buffer agent between trace amounts to about 10% by weight;
   a gelling agent; and
   water.

2. The food product of claim 1, further comprising one or more of an oligosaccharide and a sweetener.

3. The food product of claim 2, therein the sweetener is selected from cane sugar, sugar alcohol, an artificial sweetener, *stevia*, monk fruit sugar, and combinations thereof.

4. The food product of claim 2, wherein the sweetener is 10% to 80%.

5. The food product of claim 2, wherein the oligosaccharide is a syrup.

6. The food product of claim 5, wherein the syrup is selected from the group consisting of glucose syrup, corn syrup, rice syrup, invert syrup, isomaltooligosaccharide (IMO) sugar, tapioca, fructooligosaccharide (FOS) syrup, starch, fiber syrup, inulin, fruit puree, fruit concentrate, high maltose syrup, agave syrup, and combinations thereof.

7. The food product of claim 2, wherein the oligosaccharide is by weight between trace amounts and about 65%.

8. The food product of claim 2, wherein the oligosaccharide is by weight between about 25% and 55%.

9. The food product of claim 1, further comprising one or more of vitamin B12, sodium citrate, zinc, citric acid, malic acid, a natural flavor, carrot, apple, beet root, pomegranate, and vitamin C.

10. The food product of claim 9, further comprising vitamin B6 by weight, between about trace amount to 0.10%.

11. The food product of claim 9, wherein the vitamin B12 is by weight between about trace amount to 0.10%.

12. The food product of claim 1, further comprising one or more of ginger, an herbal additive, and a vegetable oil.

13. The food product of claim 1, further comprising a colorant.

14. The food product of claim 13, wherein the colorant is from a natural source.

15. The food product of claim 1, wherein the food product is a gummy.

16. The food product of claim 1, wherein the apple cider vinegar is by weight between about 1% and 45%.

17. The food product of claim 1, wherein the apple cider vinegar is by weight between about 5% to 40%.

18. The food product of claim 1, wherein the apple cider vinegar is by weight between about 12% and 13%.

19. The food product of claim 1, wherein the gelling agent is a pectin is by weight between about 1% and 20%.

20. The food product of claim 19, wherein pectin is by weight between about 1.75% and 7%.

* * * * *